INVENTOR.
LEONARD S. SUOZZO
BY
ATTORNEY

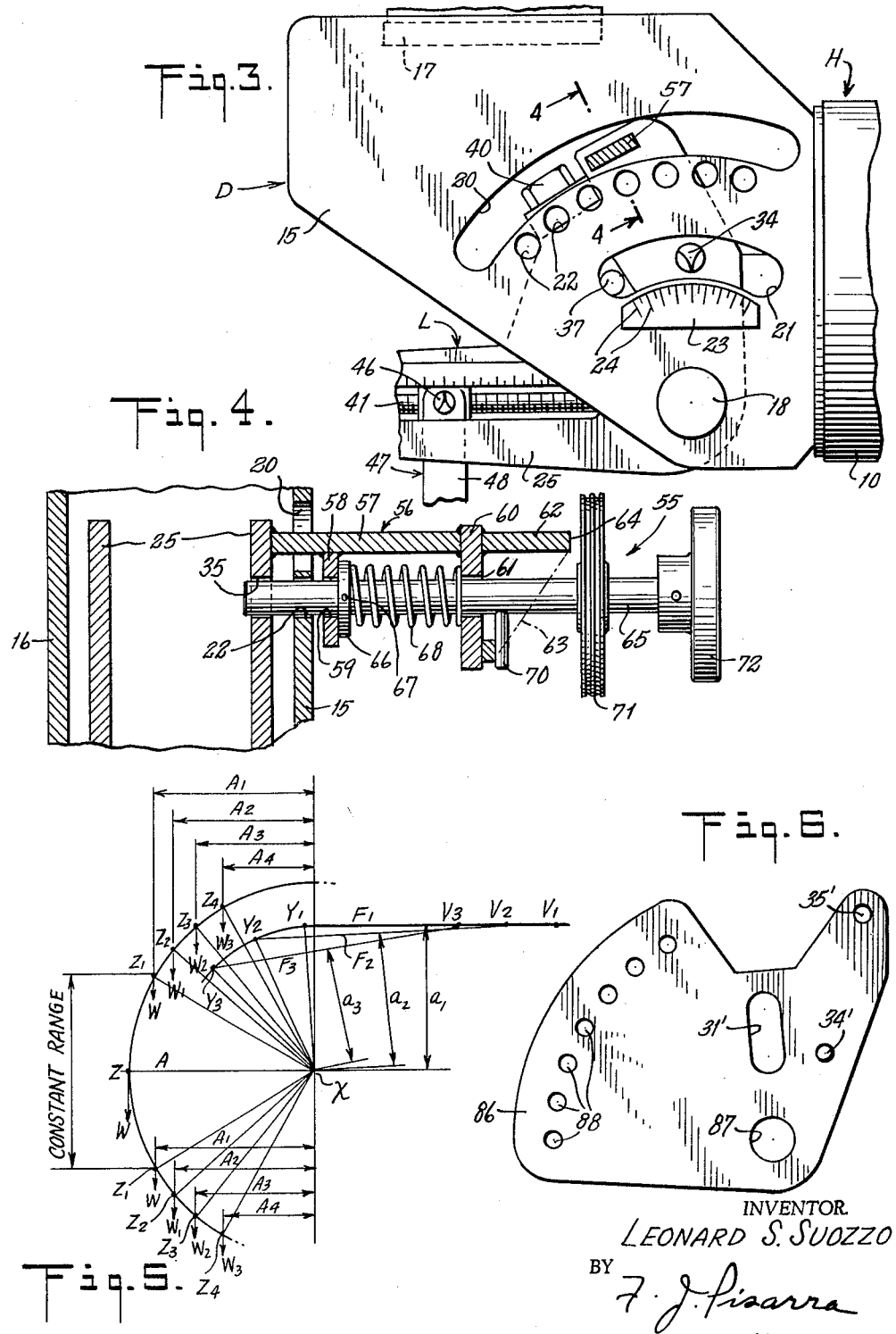

Jan. 26, 1965 L. S. SUOZZO 3,167,285
COMBINED CONSTANT-VARIABLE SPRING SUPPORT DEVICE
Filed July 27, 1962 3 Sheets-Sheet 3
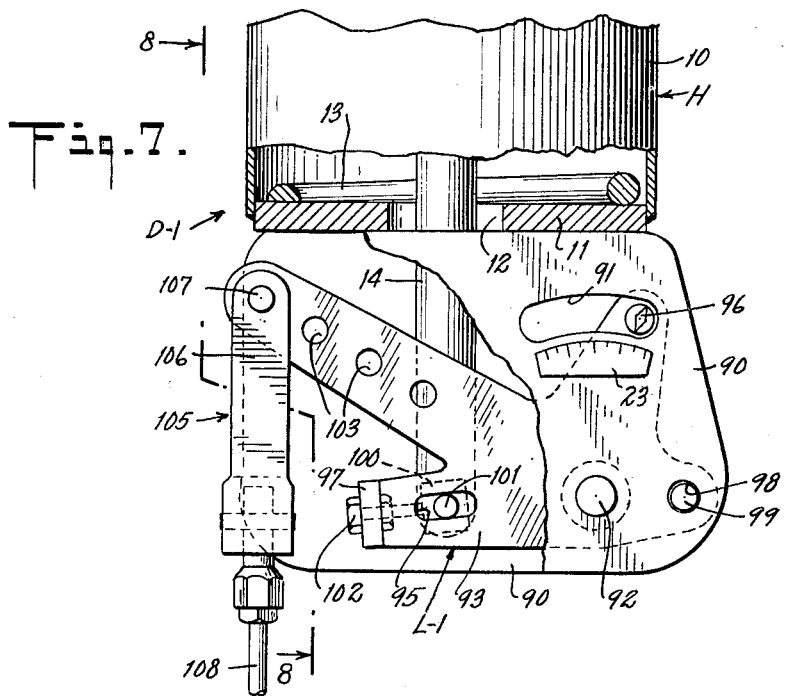
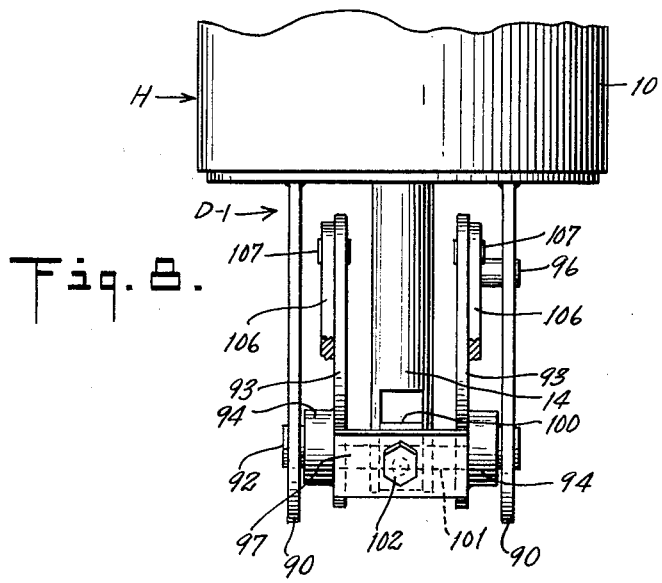
INVENTOR.
LEONARD S. SUOZZO
BY
ATTORNEY United States Patent Office 3,167,285
Patented Jan. 26, 1965

3,167,285
COMBINED CONSTANT-VARIABLE SPRING
SUPPORT DEVICE
Leonard S. Suozzo, 366 Maple Hill Road,
Hackensack, N.J.
Filed July 27, 1962, Ser. No. 212,781
1 Claim. (Cl. 248—54)

This invention relates to the art of support devices and, more particularly, to a spring support device for properly and adequately supporting a load, and for permitting movement of the load. The invention pertains, in one of its more specific aspects, to a spring support device having its parts so constructed and arranged as to function as a constant support device or a variable support device, as required by conditions of use.

The spring support device of this invention is capable of properly and effectively supporting various types of loads and may be beneficially employed in various environments and for various purposes. It may, for example, be advantageously used in steam power plants and in many chemical plants for adequately supporting high temperature piping arrangements while permitting requisite movement of the piping as the result of expansion or contraction thereof, due to temperature changes in the material of the piping. When employed in such plants, the device is adapted to furnish a constant supporting force during operation of certain of its parts within a selected range of movement thereof or a variable supporting force during operation of such parts within another selected range of movement of such parts. This eliminates the need for auxiliary spring devices, such as "booster" spring devices, which have been used in many instance heretofore to supplement the action of conventional constant support devices and to supply additional supporting forces for upward movement of piping. Moreover, the device of this invention furnishes additional supporting force, as required, to effectively overcome or compensate for friction in relatively moving parts.

The device of this invention may also be advantageously employed in other locales for weighing, handling and/or transporting loads from one place to another, as will be appreciated by persons skilled in the art from the detailed description that follows.

The primary object of this invention is to provide an improved spring support device for properly and adequately supporting various types of loads.

Another object of the invention is to provide a spring support device having its parts so constructed and arranged as to function as a constant support device or a variable support device, depending on particular conditions of use.

A further object of the invention is to provide a device of the character indicated which is relatively simple, compact and lightweight in design; that is sturdy and durable in construction; that is reasonable in manufacturing, installation and maintenance costs; and that is capable of performing its intended functions in a safe, dependable and trouble-free manner.

The foregoing objects and additional objects, together with the advantages of the invention, will be readily understood by persons trained in the art from the following detailed description and the annexed drawings which respectively describe and illustrate one recommended arrangement of apparatus embodying the invention and several modifications thereof.

In the drawings, wherein like reference characters denote corresponding parts throughout the several views:

FIG. 3 is a view in enlargement taken along line 3—3 of FIG. 1;

FIG. 4 is an enlarged fragmentary view taken along line 4—4 of FIG. 3.

FIG. 5 is a force diagram showing several relative positions of certain pivotal axes and other data during use of the form of the invention which is illustrated in FIGS. 1 through 4;

FIGS. 6 is an elevation view of a modified form of lever plate which may be used in place of corresponding plates shown in FIG. 2;

FIG. 7 is a side elevation view of a modified form of spring support device of this invention, certain parts being broken away and other parts being shown in cross-section for better illustration; and FIG. 8 is a view taken along staggered line 8—8 of FIG. 7.

Figures 1, 2:
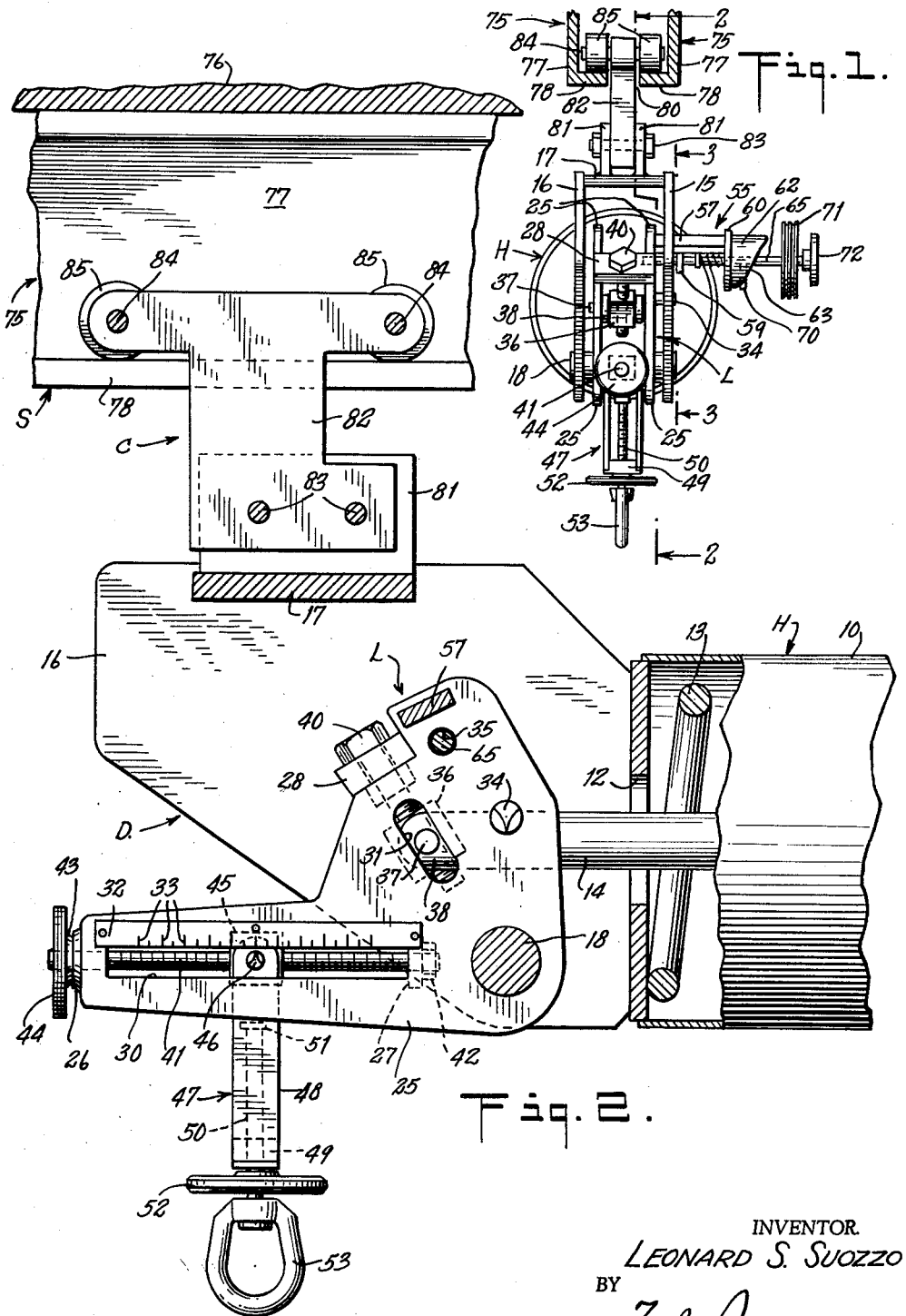
FIG. 1 is a view in end elevation of one recommended arrangement of apparatus constructed in accordance with this invention, certain parts being shown in vertical cross-section for better illustration of other parts.
FIG. 2 is a view in enlargement taken along staggered line 2—2 of FIG. 1.

Referring initially to FIGS. 1 through 4, the embodiment of the invention illustrated therein comprises three interconnected and cooperatively arranged devices and units, namely, a spring support device D, a carriage unit C and an overhead supporting unit S.

Device D comprises a housing H which includes a cylindrical side wall 10 and an end wall 11 having a central through opening 12. The housing contains a compression spring 13, a rod 14, that extends through opening 12 and is partly positioned in and movable along the opening defined by the spring, and associated devices (not shown) which may be the same as or similar to those disclosed in my Patent No. 2,923,507, granted February 2, 1960, for "Constant Support Device," to which reference may be had for further details of construction.

Secured to housing end wall 11, preferably by welding, is a pair of upstanding parallel plates 15 and 16 which are disposed to opposite sides of opening 12 and rod 14. A horizontal third plate 17 bridges the space between plates 15 and 16 and is welded to the upper portions thereof. Plates 15 and 16 carry a stationary horizontal shaft 18. Plate 15 is provided with an elongated arcuate slot 20, a relatively short arcuate slot 21 and a series of circular openings 22 which are equidistant from the axis of shaft 18 (FIG. 3). Plate 15 is also provided with a travel indicator scale 23 which is positioned adjacent slot 21 and which has graduations 24.

Reference is next had to FIGS. 1 and 2 for an understanding of the details of construction of a lever L. This lever consists of a pair of parallel generally L-shaped plates 25 and a total of three relatively short and narrow cross plates 26, 27 and 28, which are welded to plates 25 to obtain a rigid, unitary, lever construction. Plates 26, 27 and 28 are provided with through openings (not shown). Each of plates 25 is formed with an elongated first slot 30, which is located between cross plates 26 and 27, and a relatively short second slot 31, which is located between shaft 18 and cross plate 28. One of plates 25 carries a load scale 32, having graduations 33, and a combined stop pin and indicator 34 which registers with slot 21 in plate 15 and coacts with graduations 24 to denote load travel. This plate also has a circular opening 35.

Interposed between lever plates 25 is a block 36 that is equipped with a pair of coaxial pins 37 which extend freely through openings (not shown) in the bifurcated outer end portion 38 of rod 14. An adjusting bolt 40 extends through cross plate 28 and engages a through tap in block 36. Pins 37 register with slots 31 of corresponding lever plates 25. By turning bolt 40, the distance between the axes of pins 37 and shaft 18 may be varied to correspondingly alter the moment arm of the spring force. It will be observed that pins 37 form a pivotal connection between rod 14 and lever L.

A screw 41 extends through openings in cross plates 26 and 27 of the lever and is rotatably supported approximate its ends by these plates. This screw is provided at its inner end with a nut 42 which bears against cross plate 27 and at its outer end with a collar 43 which bears against cross plate 26. Nut 42 and collar 43 prevent axial movement of the screw relative to the lever. The outer end of the screw is provided with a pulley 44 to effect rotation thereof. A handwheel may be substituted for the pulley if the screw is accessible for direct manual rotation. A block 45 is provided with a through tap which is engaged by screw 41. As indicated in FIG. 2, block 45 has a pair of coaxial pins 46 which register with corresponding plate slots 30. The parts of the block are so constructed and arranged that the block is adapted to be moved toward the right or toward the left, as viewed in FIG. 2, in response to corresponding rotary movement of screw 41. The free end of one of pins 46 serves as an indicator that cooperates with the graduations 33 of scale 32.

A U-shaped clevis 47 consists of a pair of parallel arms 48 and a web 49 having a through vertical tap (not shown). A screw 50 engages the web tap and is provided at its upper end with a collar 51 to prevent accidental disengagement of the screw from the clevis. The screw is equipped with a handwheel 52. Attached to the lower end of the screw is a connector ring 53 which is rotatable relative to the screw and is adapted to be coupled to a load. Clevis 47, screw 50 and ring 53 constitute elements of a load-carrying unit.

Device D also comprises a latching means, generally indicated by numeral 55, for releasably maintaining lever L at a preselected angular position relative to plates 15 and 16. The latching means is best shown in FIGS. 1 and 4 and comprises a bracket 56 consisting of an arm 57, which is normal and welded to one of plates 25 and registers with slot 20 in plate 15, a first backing plate 58 having a through opening 59 and a second plate 60 having a through opening 61. Plates 58 and 60 are spaced apart and parallel and are normal to arm 57. Also, openings 59 and 61 are aligned with each other and with opening 35. Backing plate 60 carries an arcuate camming member 62 having a camming end surface 63 which terminates in a flat outer end portion 64. A latching pin 65 is reciprocable and rotatable relative to bracket 56 along a path which is normal to plates 15 and 25. As is best shown in FIG. 4, pin 65 extends through openings 59 and 61 and is adapted to register with a selected opening 22 and opening 35, depending on the angular position of lever L relative to plate 15 and the axial position of pin 65. A collar 66 is secured to pin 65 by a set screw 67. This collar is disposed between plates 58 and 60 and serves the dual functions of limiting movement of the pin toward the left, as viewed in FIG. 4, and a bearing element for a helical compression spring 68 which is coaxial with pin 65. It will be evident from an examination of FIG. 4 that spring 68 normally and yieldingly urges pin 65 to the left to the extent allowed by plate 58 and collar 66. A second pin 70 is secured to pin 65 and is normal thereto. Pin 70 is adapted to ride along the path defined by camming surface 63. Pin 65 is equipped with a pulley 71 and a handwheel 72 for imparting angular movement thereto about its axis. Pulley 71 is utilized when latching means 55 is not accessible for convenient manual operation and handwheel 72 is utilized when means 55 is accessible for convenient manual operation.

Supporting unit S comprises a pair of structural steel members 75 which are preferably secured to an overhead structure, such as a beam 76, in any suitable manner known to the art. Each member 75 includes a vertical element 77 and a horizontal flange 78. Flanges 78 are coplanar, parallel and spaced apart, as indicated at 80, and serve as rails for rollers which will be described further along herein.

Carriage unit C includes a pair of spaced, parallel, vertical plates 81, which are welded to horizontal plate 17, and a generally T-shaped plate 82, the lower portion of which is positioned between plates 81 and is secured thereto by bolts 83. Plate 82 projects through and above slot 80 and carries a pair of spaced parallel shafts 84. Each shaft is provided with a pair of rollers 85. As is illustrated in FIG. 1, the rollers of each shaft are adapted to ride along the upper surface of corresponding flanges 78.

For the purpose of outlining the mode of operation of the form of the invention illustrated in FIGS. 1 through 4, it is first assumed that the parts are assembled and in the relative position shown in these views. With the parts so arranged, the apparatus is adapted to support any selected load within the load range for which it is designed. Pin 65 is in its protracted position relative to bracket 56 since it registers with the central opening 22 of plate 15 and with opening 35 of plate 25. Accordingly, lever L is latched to plate 15 and is restrained against angular movement relative to that plate. The load to be supported is now connected to ring 53 of the load-carrying unit in suspended relation thereto. The load may, for example, consist of a relatively stationary series of pipes that transmit a high temperature fluid or a portable mass that is to be moved from one location to another. When the load is connected, pin 65 is turned through the medium of pulley 71 or handwheel 72. This causes pin 70 to ride along camming surface 63, against the action of spring 68, and pin 65 to be retracted or moved to the right, as viewed in FIG. 4, and placed out of registry with openings 35 and 22. As a consequence, lever L is now free to pivot relative to plates 15 and 16 about the axis of shaft 18.

In the case of a piping load, the parts of device D are so constructed and arranged as to furnish a substantially constant supporting force or a variable supporting force depending on the angular position of lever L relative to plates 15 and 16. This permits the piping to move upwardly or downwardly in response to expansion or contraction of the material of the piping, due to variations in the temperature of the fluid transmitted therethrough.

Spring 13, rod 14, lever L and the load-carrying unit cooperate in a manner similar to that of corresponding parts which are disclosed in said Patent No. 2,923,507, to which reference may be had for further details of general operation.

In the case of a portable load, the same is suspended by the apparatus and may be raised or lowered to desired position by turning screw 50 through the medium of handwheel 52. The portable load may be coupled to the load-carrying unit at one location and then raised until it is freely suspended by turning handwheel 52. The load and device D may then be transported to another location by propelling carriage unit C along flanges or rails 78. When the load arrives at its destination, pulley 71 or handwheel 72 is turned to release pin 70 and allow spring 68 to actuate pin 65 to latched position, i.e., into registry with an opening 22 and opening 35. This relocks lever L to plate 15 and prevents damage to parts or injury to the operator when the load is released. The load is now released by turning handwheel 52 in a manner to lower the load until it comes to rest on a selected support, such as a floor, counter or the like, after which the load is uncoupled from ring 53.

As was stated earlier herein, device D of this invention is adapted to furnish a constant supporting force or a variable supporting force, as desired. This will be readily understood by persons trained in the art upon consideration of FIG. 2 and the force diagram shown in FIG. 5. In the diagram, $V_1$, $V_2$ and $V_3$ denote positions of the pivotal axis of rod 14 within housing H, as disclosed in said Patent No. 2,923,507; X denotes the pivotal axis of shaft 18; $Y_1$, $Y_2$ and $Y_3$ denote positions of the pivotal axis of coaxial pins 37 corresponding to $V_1$, $V_2$ and $V_3$, respectively; and Z, $Z_1$, $Z_2$, $Z_3$ and $Z_4$ denote selected positions of the pivotal axis of coaxial pins 46. Also, $F_1$, $F_2$ and $F_3$ denote the forces exerted by spring 13 and correspond, respectively, to positions $Y_1$, $Y_2$ and $Y_3$ of the pivotal axis of pins 37; $a_1$, $a_2$ and $a_3$ denote the moment arms of spring forces $F_1$, $F_2$ and $F_3$, respectively; W, $W_1$, $W_2$ and $W_3$ denote loads; and A, $A_1$, $A_2$ and $A_3$ denote the moment arms of corresponding loads.

The parts are so designed and arranged that the moment M of the spring force is substantially constant. Thus, $$M = F_1 a_1 = F_2 a_2 = F_3 a_3$$

Also, device D will furnish a substantially constant supporting force within the portion of the curve of FIG. 5 that is labeled "Constant Range," between points $Z_1$ and $Z_1$ thereon. This is based on the fact that the parts are so designed and arranged that the moment of the load within the "Constant Range" is substantially equal to the moment of the supporting force. Thus, $$WA = F_1 a_1 = F_2 a_2 = F_3 a_3$$

In the portions of the curve above and below the "Constant Range" the load moments do not equal corresponding force moments, as will be evident from the following equations:

$$\frac{M}{A_2} = W_1$$

$$\frac{M}{A_3} = W_2$$

$$\frac{M}{A_4} = W_3$$

Accordingly, by moving the pivot axis of pins 46 closer to or further from the axis of shaft 18, through the medium of screw 41 and block 45, the moment arm of the load may be correspondingly decreased or increased and the device may be used to furnish a variable supporting force to a selected load.

Reference is next had to FIG. 6 which illustrates a modified form of lever plate 86 which may be used in place of plate 25 (FIG. 2) of lever L. As in the case of plate 25, plate 86 is provided with a slot 31' corresponding to slot 31, a pin 34' corresponding to pin 34, an opening 35' corresponding to opening 35 and an opening 87 for reception of shaft 18. In place of screw 41 and associated parts of lever L, plate 86 is provided with a series of spaced openings 88 which are equidistant from the center of opening 87. Clevis 47 of the load-carrying unit is adapted to be pivotally connected to any selected opening 88. It will be noted that the horizontal distances between the centers of successive openings 88, starting with the lowermost opening, and a vertical line through the center of opening 87 are progressively shorter. These distances represent corresponding moment arms of the load. Depending on which opening is selected for connection to the load-carrying unit, the device will furnish a constant supporting force or a variable supporting force, as desired.

The form of the invention shown in FIGS. 7 and 8 is the same in many respects as that illustrated in FIGS. 1 through 4. In FIGS. 7 and 8, a spring support device D-1 comprises a housing H which is positioned vertically, i.e., turned 90° from housing H of FIG. 2. Welded to and depending from housing bottom wall 11 is a pair of spaced parallel plates 90, one of which has an arcuate slot 91 corresponding to earlier described slot 21, and carries a travel indicator scale 23. Plates 90 carry a horizontal shaft 92.

Device D-1 also comprises a lever L-1 which includes a pair of spaced, identical, parallel plates 93 that are affixed by welding to a hub 94. Plates 93 are provided with aligned slots 95. One of these plates carries a combined stop pin and indicator 96 which registers with slot 91. The lever is positioned between plates 93 and is pivotal about the axis of shaft 92 which extends through the hub. The lever is provided with a cross plate 97 (FIG. 8) which corresponds to cross plate 28. The lever is adapted to be maintained in the relative position illustrated in FIG. 7 by a removable pre-set pin 98 which extends through an opening 99 in one of the plates 90 and an aligned opening (not shown) in the adjacent lever plate 93. A block 100 is connected to the lower end of rod 14 and is equipped with a pair of coaxial pins 101 which register with corresponding slots 95. An adjusting bolt 102 extends through an opening in cross plate 97 and engages a tap in block 100. By turning bolt 102 the distance between the axes of pins 101 and shaft 92 may be varied, as desired. Each lever plate is provided with a series of aligned drill holes 103 that are spaced along an extended radius of shaft 92.

Device D-1 is pivotally connected to a load-carrying unit 105 which will now be described. This unit includes a clevis having a pair of arms 106 that are pivotally connected to the lever plates by corresponding coaxial pins 107 which register with selected aligned openings 103. The load-carrying unit also includes a coupling device 108 which is threadedly connected to the clevis and is adapted to be connected to a load (not shown). It will be apparent from an examination of FIG. 7 that the load moment arm may be decreased by connecting the load-carrying unit to a pair of aligned openings 103 which are closer to the axis of shaft 92.

The parts of device D-1 are so designed and arranged as to furnish a constant supporting force or a variable supporting force, depending on which pair of aligned openings 103 is selected for reception of pins 107.

The device shown in FIGS. 7 and 8 operates in a manner similar to that of FIGS. 1 through 4. It will be appreciated that various parts and devices shown in FIGS. 1 through 4 may be incorporated in the construction appearing in FIGS. 7 and 8.

From the foregoing, it is believed that the constructions, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

A device of the character described comprising a support, spring means carried by the support, a rod operatively associated with the spring means, a lever connected to the support and movable relative thereto about a first pivotal axis, said lever being connected to the rod and movable with respect thereto about a second pivotal axis, means for varying the distance between the first and second pivotal axes, a load-carrying unit connected to the lever and movable with respect thereto about a third pivotal axis, means for varying the distance between the second and third pivotal axes, said pivotal axes being spaced apart, generally horizontal and parallel, the lever being provided with a first opening and the support being provided with a series of second openings which are equidistant from the first pivotal axis, and latching means including a bracket secured to and movable with the lever about the first pivotal axis, a member carried by the bracket, said member being slidable and rotatable relative to the bracket and being movable into and out of registry with the first opening and a selected second opening, resilient means for normally and yieldingly urging the member in one direction relative to the bracket, and means responsive to rotary movement of the member in one direction to effect corresponding sliding movement thereof in a corresponding direction, said last-mentioned means comprising a cam carried by the bracket and an element carried by the member and engaging the cam.

References Cited in the file of this patent

UNITED STATES PATENTS

| | | |
|---|---|---|
| 1,906,209 | Harding | Apr. 25, 1933 |
| 2,929,594 | Wood | Mar. 22, 1960 |
| 2,949,270 | Wood | Aug. 16, 1960 |
| 2,954,909 | Miller | Oct. 4, 1960 |
| 2,965,341 | Sherburne | Dec. 20, 1960 |
| 2,975,995 | Sherburne | Mar. 21, 1961 |

FOREIGN PATENTS

| | | |
|---|---|---|
| 880,191 | Great Britain | Oct. 18, 1961 |